United States Patent
Moule et al.

(10) Patent No.: US 12,030,311 B2
(45) Date of Patent: Jul. 9, 2024

(54) TEST APPARATUS

(71) Applicants: Dave Moule, Shropshire (GB); Mark Smith, Shropshire (GB)

(72) Inventors: Dave Moule, Shropshire (GB); Mark Smith, Shropshire (GB)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 17/759,205

(22) PCT Filed: Feb. 16, 2021

(86) PCT No.: PCT/JP2021/005589
§ 371 (c)(1),
(2) Date: Jul. 21, 2022

(87) PCT Pub. No.: WO2021/166867
PCT Pub. Date: Aug. 26, 2021

(65) Prior Publication Data
US 2023/0081122 A1  Mar. 16, 2023

(30) Foreign Application Priority Data
Feb. 18, 2020  (GB) ................................... 2002208

(51) Int. Cl.
*B41J 2/165*  (2006.01)
*B41J 2/045*  (2006.01)

(52) U.S. Cl.
CPC ....... *B41J 2/04535* (2013.01); *B41J 2/04561* (2013.01); *B41J 2/0458* (2013.01)

(58) Field of Classification Search
CPC ............................. B41J 2/04561; B41J 2/165
See application file for complete search history.

(56) References Cited

U.S. PATENT DOCUMENTS

| | | | |
|---|---|---|---|
| 3,028,502 A | 4/1962 | Schiffbauer et al. | |
| 4,407,197 A | 10/1983 | Jeschke | |
| 5,992,977 A * | 11/1999 | Horinaka | B41C 1/055 |
| | | | 347/112 |
| 7,355,790 B1 * | 4/2008 | Wagner | G02B 27/34 |
| | | | 359/399 |

(Continued)

FOREIGN PATENT DOCUMENTS

| | | |
|---|---|---|
| CH | 466330 | 12/1968 |
| CN | 1939731 | 4/2007 |

(Continued)

OTHER PUBLICATIONS

Yamamoto, MachineTranslationofJP-2021133584-A, 2021 (Year: 2021).*

(Continued)

*Primary Examiner* — Scott A Richmond
(74) *Attorney, Agent, or Firm* — IPUSA, PLLC

(57) ABSTRACT

The disclosure concerns a test apparatus comprising a drum (100) configured such that ink drops (200) deposited on the surface of the drum form a printed marking (210) on the surface of the drum. The test apparatus further comprises an ink removal unit (300) configured to remove ink from the surface of the drum. The drum is at least partially transmissive of light and a light source (800) is disposed inside the drum to controllably illuminate the drum.

20 Claims, 8 Drawing Sheets

(56) References Cited

U.S. PATENT DOCUMENTS

| | | |
|---|---|---|
| 2005/0052711 A1 | 3/2005 | Schaede |
| 2007/0070107 A1 | 3/2007 | Shamoun et al. |
| 2008/0079772 A1* | 4/2008 | Kojima ................ B41J 2/16585 347/33 |
| 2009/0040261 A1* | 2/2009 | Zhang .................... B41J 29/393 347/19 |
| 2013/0083107 A1* | 4/2013 | Nishikawa ............ B41J 2/0451 347/10 |
| 2013/0135370 A1* | 5/2013 | Oba ........................ B41J 2/135 347/9 |
| 2013/0182029 A1 | 7/2013 | Snyder |

FOREIGN PATENT DOCUMENTS

| | | |
|---|---|---|
| DE | 10217403 | 7/2003 |
| JP | S63-209947 | 8/1988 |
| JP | H06-340063 | 12/1994 |
| JP | 2005-104147 | 4/2005 |
| JP | 2007-127651 | 5/2007 |
| JP | 2007-248888 | 9/2007 |
| JP | 2010008975 A * | 1/2010 |
| JP | 2010-044771 | 2/2010 |
| JP | 2010-127910 | 6/2010 |
| JP | 2010-208148 | 9/2010 |
| JP | 2013-226700 | 11/2013 |
| JP | 2014-054758 | 3/2014 |
| JP | 2019-136979 | 8/2019 |
| JP | 2019-144139 | 8/2019 |
| JP | 2019214133 A * | 12/2019 |
| JP | 2021133584 A * | 9/2021 |
| KR | 1020100131063 | 12/2010 |

OTHER PUBLICATIONS

Yoshida, Machine Translation of JP-2019214133-A, 2019 (Year: 2019).*
Tsutsumi, Machine Translation of JP-2010008975-A, 2010 (Year: 2010).*
Japanese Office Action for 2022-544804 dated Sep. 5, 2023.
Chinese Office Action for 202180014817.2 dated Aug. 24, 2023 with English Translation.
International Search Report dated May 20, 2021 in PCT/JP2021/005589.

* cited by examiner

[Fig. 2]
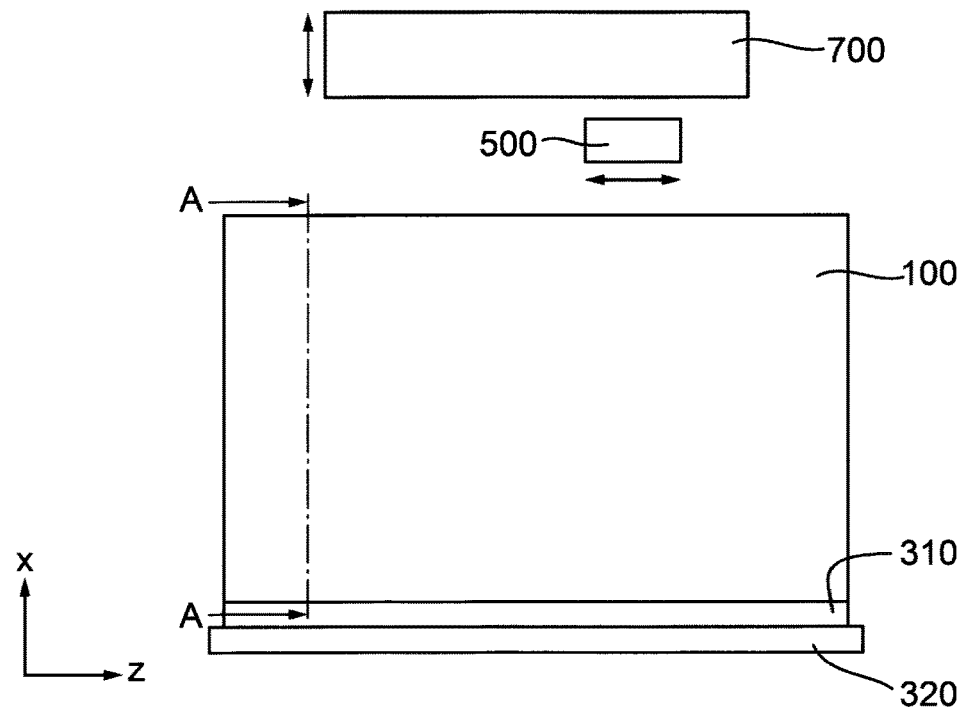
[Fig. 3]
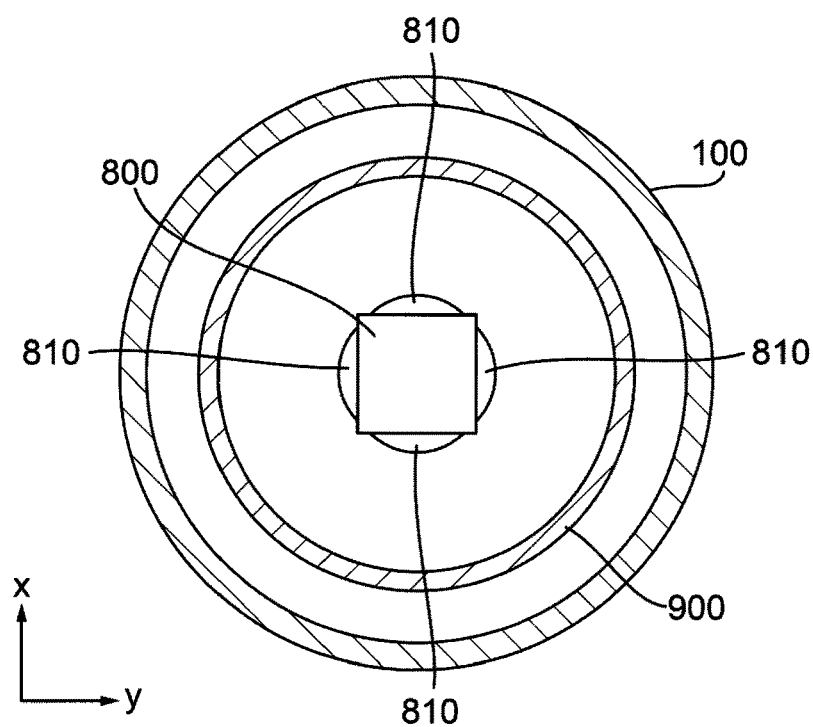

[Fig. 4]
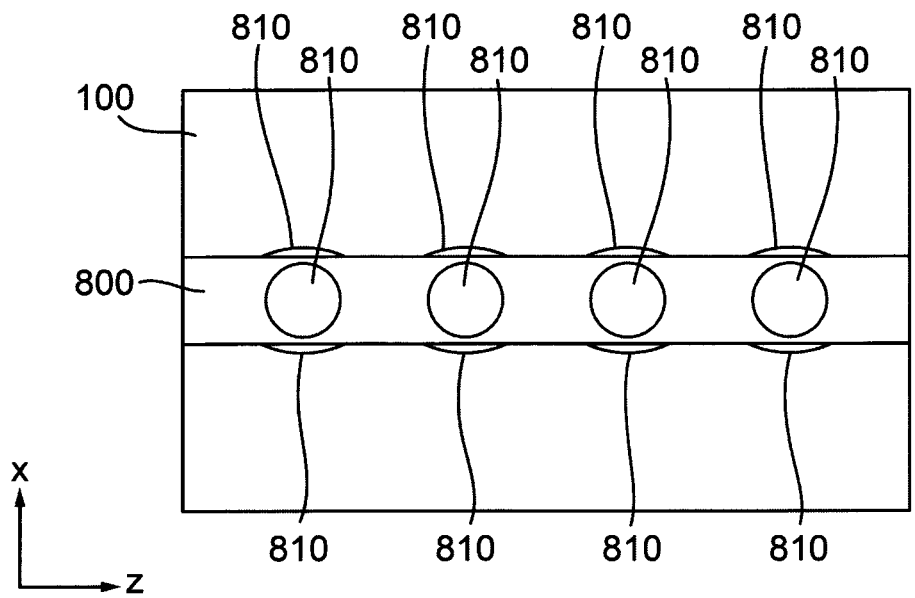
[Fig. 5]
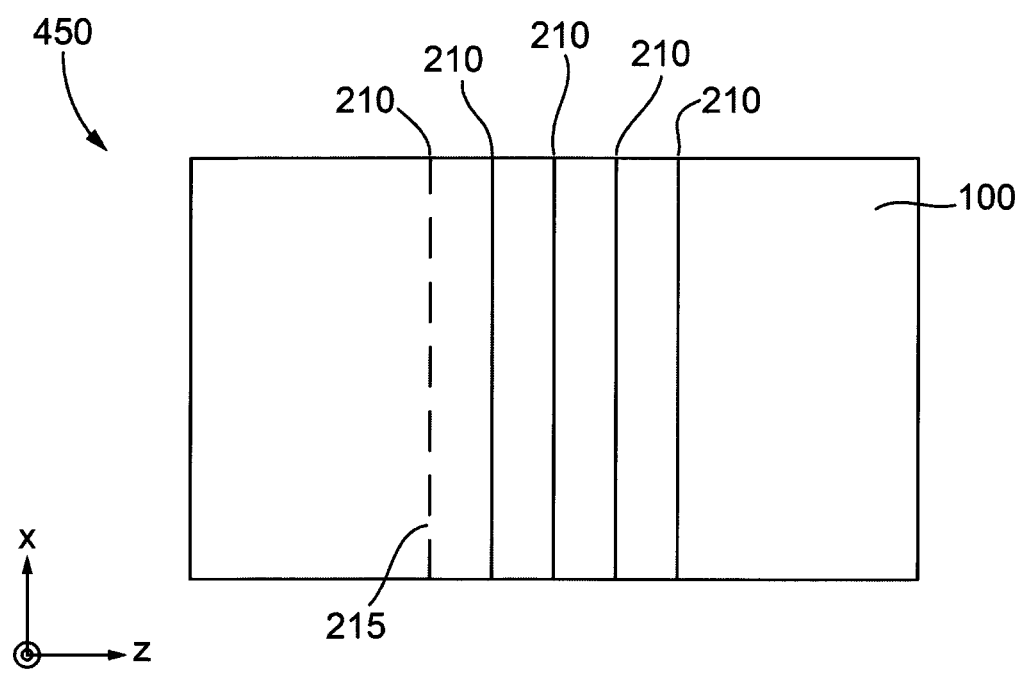

[Fig. 6]
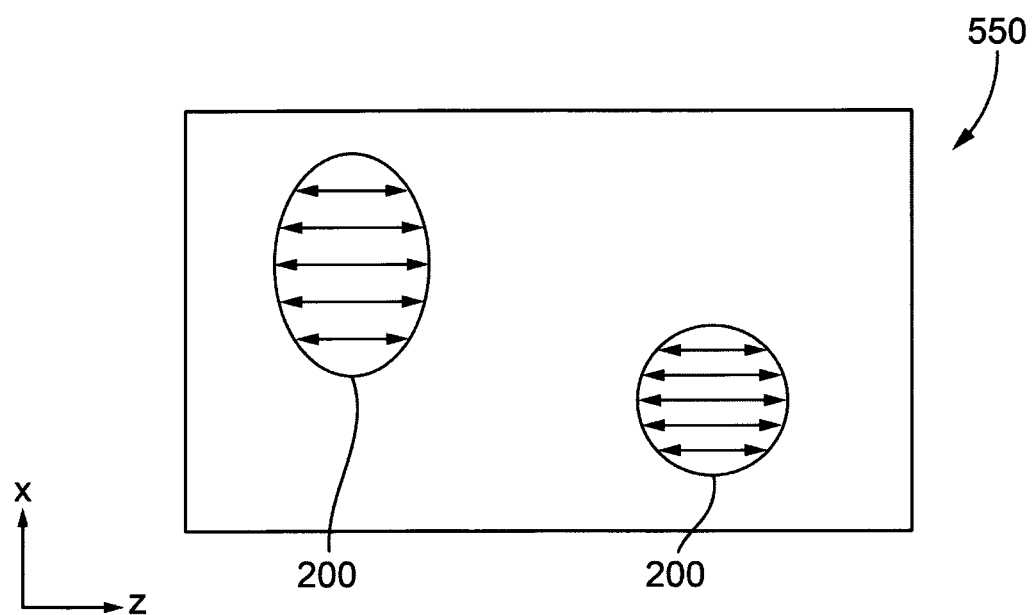

[Fig. 7A]
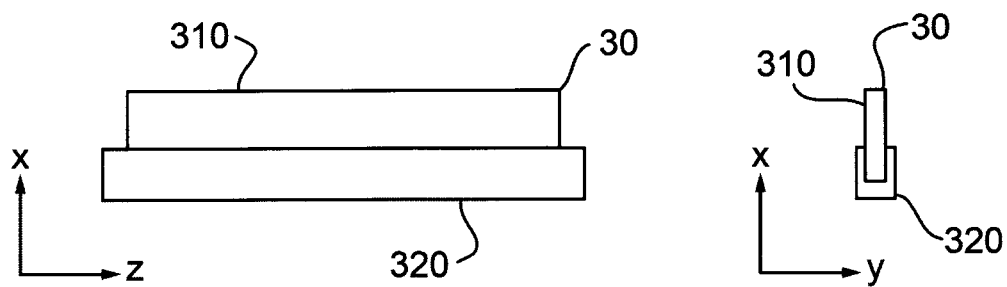
[Fig. 7B]
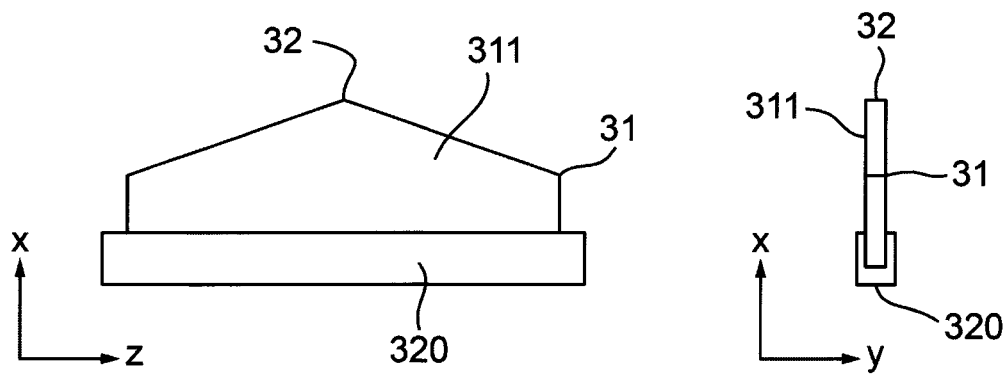

[Fig. 8A]
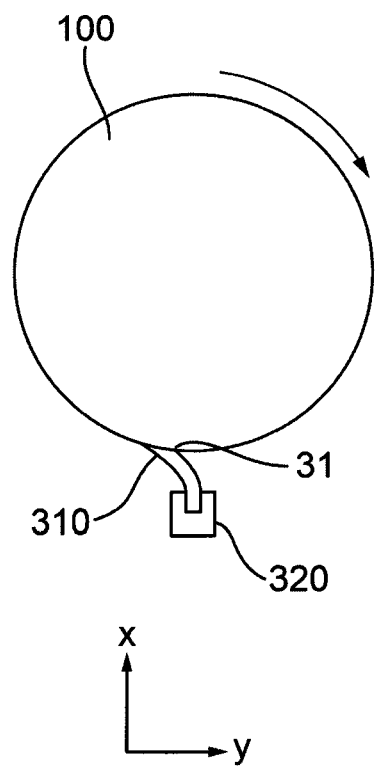

[Fig. 8B]
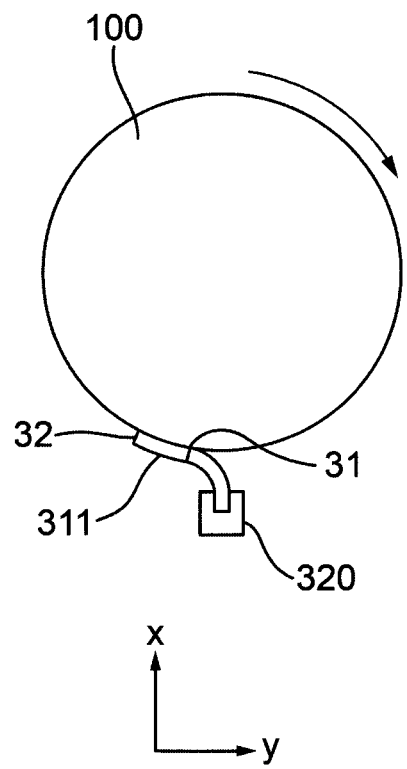
[Fig. 9]
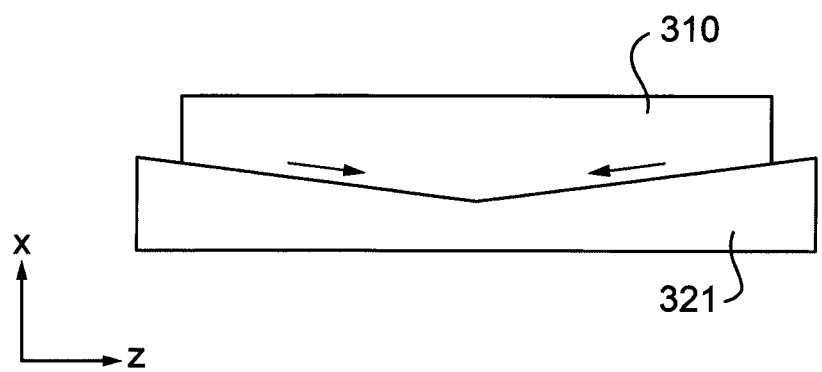

[Fig. 10]
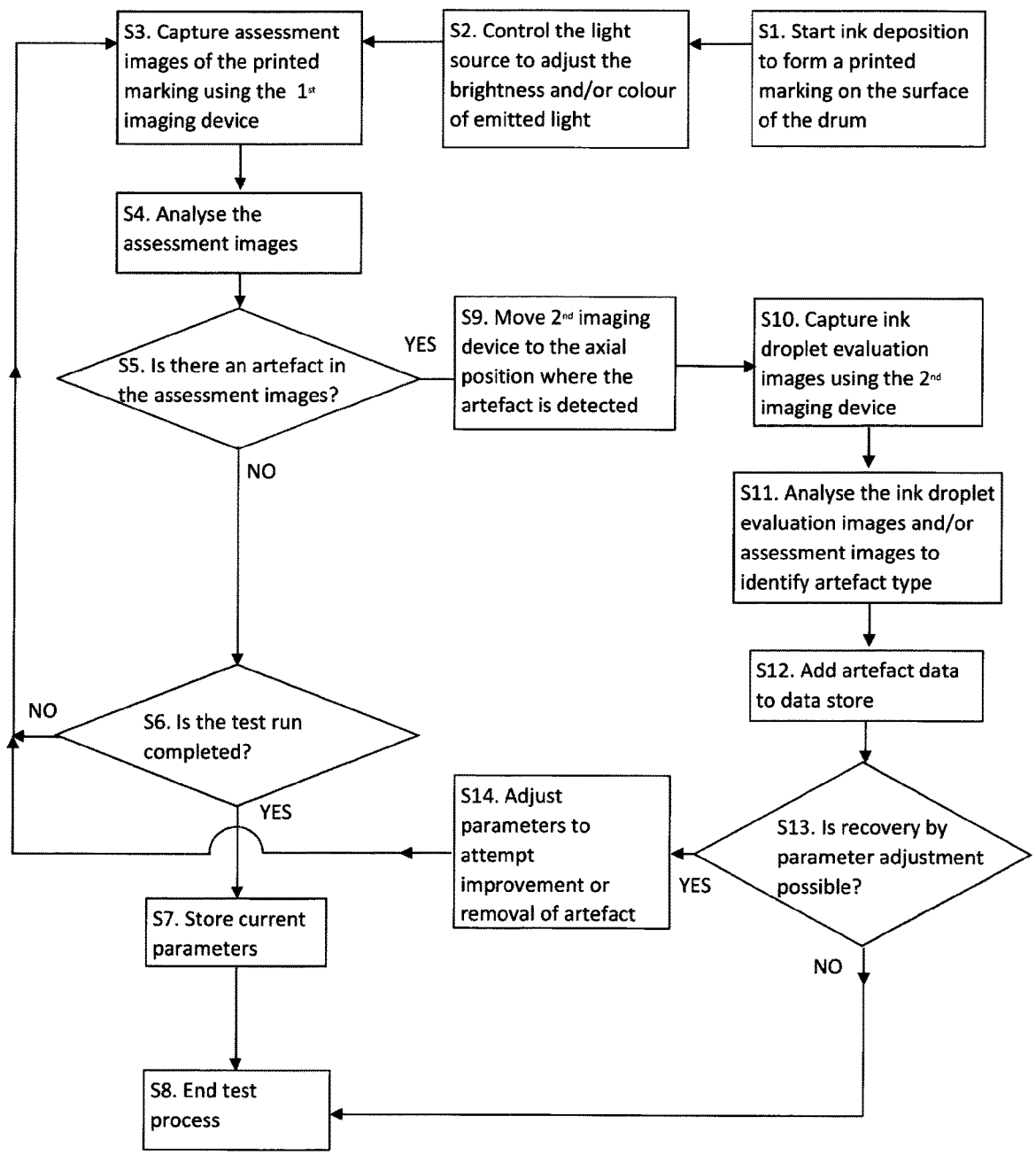

TEST APPARATUS

TECHNICAL FIELD

The present invention relates to a test method and apparatus suitable for use in, for example, the evaluation of ink, ink heads and ink nozzles.

Typical test apparatuses known in the art are generally provided with paper on which a pattern is printed. The printed pattern is then inspected to determine whether there are any artefacts indicative of unexpected printing performance or print errors. In this manner, the quality of the ink, the ink nozzles, the ink head or a combination thereof is assessed. The typical apparatus therefore uses a significant amount of paper which is disposed of after a single use.

Alternative arrangements, such as disclosed in JP S63-209947, provide a re-usable cylindrical printing surface instead of a disposable recording medium.

SUMMARY OF INVENTION

Solution to Problem

The present invention aims to provide means to assess the quality of different types and colours of ink effectively and efficiently. Furthermore, the invention aims to improve the effectiveness of nozzle evaluation. The invention also aims to reduce the cost and waste associated with the use of disposable recording mediums in the test process.

Means to Solve the Problem

In accordance with the present invention, a test apparatus comprises a drum configured such that ink drops deposited on the surface of the drum form a printed marking on a surface of the drum, the drum being at least partially transmissive of light; an ink removal unit configured to remove ink from the surface of the drum; and a light source disposed inside the drum to controllably illuminate the drum.

Optionally, the test apparatus comprises a first imaging device configured to capture assessment images of the surface of the drum, wherein the assessment images include an area of the drum including the printed marking on the surface of the drum.

Optionally, the test apparatus comprises a light control module configured to control the light source to emit a selected colour of light.

Optionally, the drum comprises a glass cylinder.

Optionally, the test apparatus comprises a diffuser disposed between the light source and the drum.

Optionally, the diffuser is a cylinder disposed coaxially with the drum.

Optionally, the diffuser comprises a polymer comprising acetal.

Optionally, the test apparatus comprises a second imaging device configured to capture droplet evaluation images of ink drops, wherein the ink drops are in motion and traveling towards the surface of the drum.

Optionally, the test apparatus comprises a strobe light unit disposed facing the second imaging device and configured to illuminate a field of view of the second imaging device at time intervals in synchronisation with the time intervals during which the second imaging device captures the droplet evaluation images.

Optionally, the test apparatus comprises a print assessment unit configured to determine an artefact in the printed marking based on the assessment images captured by the first imaging device, and determine an axial position of the artefact in the assessment image; and an imaging device movement unit configured to move the second imaging device in an axial direction of the drum based on the axial position of the artefact in the assessment image.

Optionally, the light control module is configured to automatically vary the selected colour of light emitted by the light source to maximise the contrast between the printed marking and the light emitted from the drum.

Optionally, the test apparatus comprises a strobe light setting unit configured to set the colour of light emitted by the strobe light unit to be the same as the selected colour of light emitted by the light source.

Optionally, the test apparatus comprises an ink head supporting unit configured to support an ink ejection device and to be movable in a radial direction of the drum.

The ink test apparatus may be an ink drop observation apparatus.

Optionally, the ink removal unit comprises a wiper blade configured to contact the surface of the drum along the axial direction of the drum, wherein the wiper blade is configured to contact the axial centre of the surface of the drum at a position further in the direction of rotation of the drum than the position at which the wiper blade contacts the axial ends of the surface of the drum.

In accordance with the present invention, a printing device comprises a test apparatus wherein the ink removal unit is configured to transfer ink from the surface of the drum to a recording medium.

In accordance with the present invention, a test method comprises depositing ink drops on a drum to form a printed marking on a surface of the drum, the drum being at least partially transmissive of light; controlling a light source disposed inside the drum to illuminate the drum; and removing the ink from the surface of the drum.

The test method may be an ink drop testing method.

The present invention will now be described with reference to exemplary embodiments and the accompanying figures, in which:

BRIEF DESCRIPTION OF DRAWINGS

FIG. 2 is a schematic diagram of the front of the drum, ink removal unit, ink ejection device and second imaging device of FIG. 1;

FIG. 3 is a cross-sectional view through section A-A of the drum of FIG. 2;

FIG. 4 is a schematic diagram of a light source in a transparent drum according to an embodiment of the present invention.

FIG. 5 is an exemplary assessment image.

FIG. 6 is an exemplary droplet evaluation image.

FIGS. 7A and 7B are schematic diagrams of ink removal units according to embodiments of the present invention.

FIGS. 8A and 8B are schematic diagrams of the ink removal units of FIG. 7 in contact with a drum.

FIG. 9 is an exemplary configuration of an ink removal unit according to an embodiment of the present invention.

FIG. 10 is a flow chart of a test method according to an embodiment of the present invention.

OVERVIEW

Figure 1:
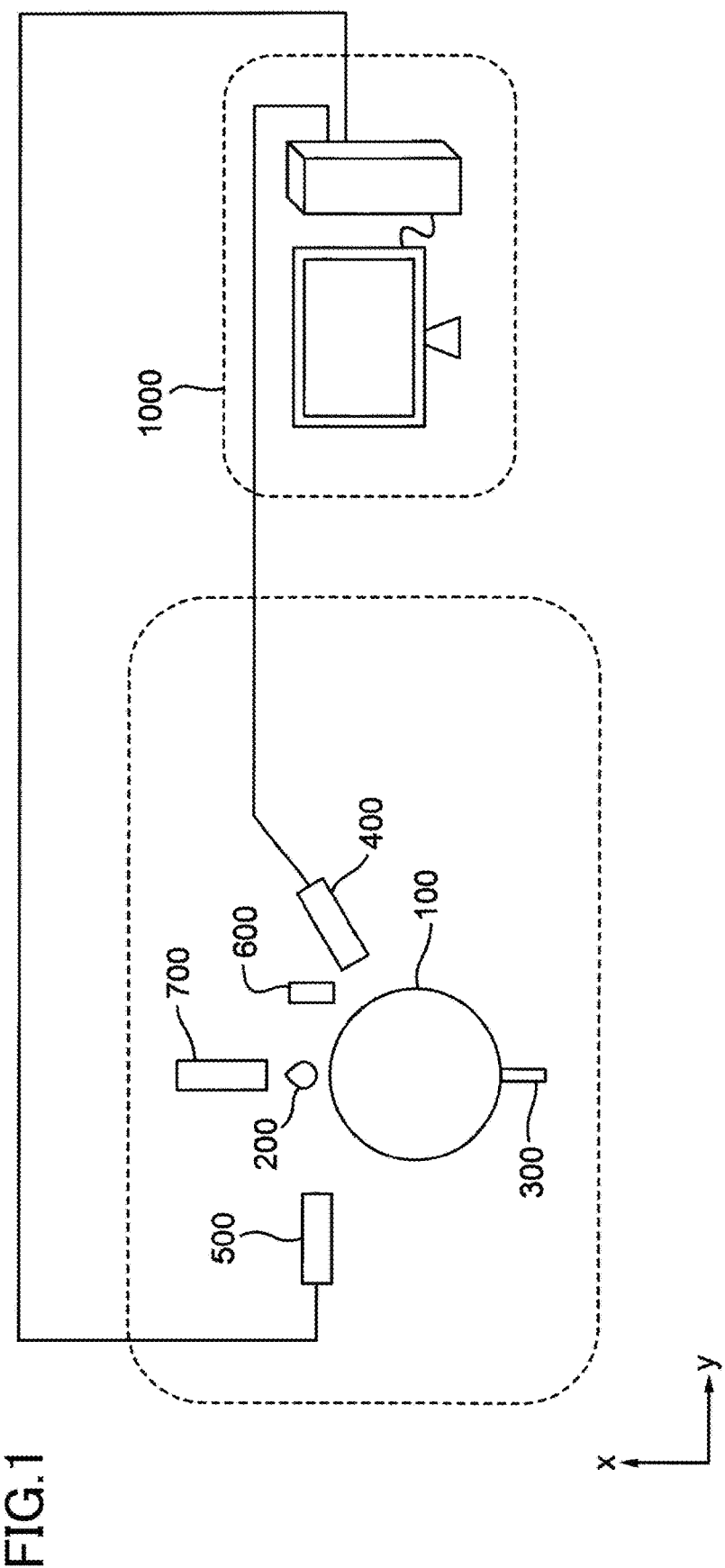
FIG. 1 is a schematic diagram of a test apparatus according to an embodiment of the present invention.

As discussed above, traditional test devices have the problem that the disposable recording medium is wasteful and expensive to replace. Although some test apparatus do not use a disposable recording medium, there remains a problem that not all types and colours of ink may be clearly visible on the surface of the re-usable printing surface. For example, some colours of ink do not show clearly on certain backgrounds due to a lack of contrast.

The test apparatus as shown in FIG. 1 comprises a drum 100 configured such that ink drops 200 deposited on the surface of the drum 100, for example from ink ejection device 700, form a printed marking on a surface of the drum 100.

The test apparatus also comprises a light source disposed inside the drum 100. The drum 100 is at least partially transmissive of light. The drum 100 may therefore be illuminated by the light from the light source. Thus, the printed marking may be seen more clearly and any errors, evidenced by artefacts in the printed marking, are more likely to be detected. Any deviation from the expected printing performance can therefore be readily detected, for example by visual inspection by eye by a user or by a camera capturing images of the printed markings, and the associated issues addressed.

As shown in FIG. 1, a first imaging device 400 (for example, a camera) may be provided to capture assessment images of the printed marking on the surface of the drum. The assessment images may be transmitted to analysis apparatus 1000, such as a computer as shown in FIG. 1. The analysis apparatus 1000 comprises a print assessment unit configured to analyse the assessment images, for example to identify any artefacts in the printed marking captured in the assessment image. This information can be used to determine when the ink ejection device is not operating as expected. The information can also be used to help identify the cause of any print errors.

The test apparatus also comprises an ink removal unit 300 configured to remove ink from the surface of the drum 100. This ensures that ink from a printed marking does not remain on the surface of the drum 100. As such, the drum surface is clean for more ink drops 200 to be deposited to form the printed marking, without the previous ink deposits influencing the evaluation.

As shown in FIG. 1, a second imaging device 500 (for example, a camera) may be provided to capture droplet evaluation images of the ink drops in motion towards the drum. The droplet evaluation images may be transmitted to analysis apparatus 1000, such as a computer as shown in FIG. 1. The analysis apparatus 1000 comprises a drop assessment unit configured to analyse the droplet evaluation images, for example to estimate the volume, center of gravity position, and/or trajectory of the ink drops captured in the droplet evaluation images. This information can be useful to determine whether the ink ejection device is operating correctly and to establish the cause of any artefact in the printed marking.

Drum

The drum 100 of the test apparatus is provided such that the ink, for example from an ink ejection device 700, is deposited on the drum 100 to form a printed marking on the surface of the drum 100. Preferably, the printed marking is formed on an outer surface of the drum 100. With this configuration the ink drops 200 may be deposited directly on the surface of the drum 100. The evaluation apparatus therefore does not require traditional, disposable recording medium for the deposition of the ink drops. Thus, the cost of purchasing and installing the replacement recording medium with each use is avoided. Furthermore, the apparatus does not require recording medium transfer units to transfer the used recording medium away from the drum, therefore the size and complexity of the apparatus can be reduced.

The drum 100 is at least partially transmissive of light. For example, the drum 100 may be at least partially translucent or transparent The outer surface of the drum 100 is preferably smooth. The average surface roughness (Ra) of the outer surface is preferably 50 nm or less. The outer surface of the drum 100 is more preferably a glass surface. A smooth outer surface of the drum 100 ensures that any detected artefacts are genuinely the result of printing error and not of defects in the outer surface of the drum 100 on which the printed marking is formed.

The drum 100 is preferably configured to rotate. The drum 100 may be configured to rotate when the test apparatus is in use. The drum 100 may be configured to rotate such that the printed marking on the surface of the drum 100 first passes a location in the field of view of a first imaging device 400 before passing the ink removal unit 300. The drum 100 may be configured to rotate such that the printed marking on the surface of the drum is removed by the ink removal unit 300. Therefore the surface of the drum 100 is clean for the deposition of more ink drops 200 to again form a printed marking.

The drum 100 preferably comprises a cylindrical part. The cross-section of the cylindrical part desirably deviates from a perfect circle by 0.1 mm or less. The ink drops 200 may be deposited on the outer surface of the cylindrical part of the drum 100. The cylindrical part of the drum 100 is a part of the drum that is transmissive of light. For example, the cylindrical part may be translucent or transparent. The cylindrical part of the drum 100 may be glass.

The terminal ends of the drum 100 may be provided with terminal end walls to cover the terminal ends of the drum. There may be a seal between the terminal end walls and a cylindrical part of the drum 100. Therefore, any ink deposited around the axial ends of the drum 100 may be prevented from entering the drum. The terminal end walls of the drum 100 may be configured to be removable. The terminal end walls of the drum 100 may be configured to be openable, for example by a hinge. Therefore, there may be access to the light source disposed within the drum 100.

The ink drops 200 may be deposited from an ink ejection device 700. The ink ejection device 700 may be disposed above the drum 100 during use.

Printed Marking

The printed marking may, for example, be a solid block, or a pattern, or a random series of markings. The printed marking on the surface of the drum 100 can be assessed to determine whether there is an artefact in the printed marking. An artefact may be evidence of an error or an unexpected printing result in the printed marking. An artefact may be identified by inspecting the printed marking directly by a user observing the apparatus in use. Preferably, the test apparatus comprises a first imaging device 400 configured to capture one or more assessment images of printed markings.

The ink drops may be deposited by and ink ejection device 700, which may comprise an ink head. The ink ejection device may, for example, be a piezo electric print head, or may be a thermal-jetting print head. The ink ejection device 700 may be configured to eject ink in accordance with printing commands. The printing commands are applied according to the target marking. The target marking is the expected printed marking, with no artefacts.

Light Source

The light source 800 is disposed inside the drum 100 to controllably illuminate the drum 100. The light source 800 may be controllable to change the brightness and/or the colour of the light emitted from the light source. In this way, the visibility of the printed marking on the surface of the drum 100 may be improved.

The light source 800 may be configured to emit light in the direction of the first imaging device 400. The light source 800 may therefore emit light to illuminate an area of the surface of the drum 100 in the field of view of the first imaging device 400. The light source 800 may be configured to emit light in several different axial directions of the drum. The light source 800 may therefore emit light to illuminate the outer circumference of the drum 100.

The light source 800 may be configured to emit light from multiple locations along the axial length of the drum 100, as shown in FIG. 4.

As shown in FIG. 3, the light source 800 is disposed within the drum 100. The light source 800 may be disposed within a diffuser 900. The light source 800 is preferably disposed closer to the central axis of the drum 100 than the diffuser 900 is to the central axis of the drum 100. The diffuser 900 may be configured to have a length, in an axial direction of the drum 100, equal to or greater than the length of the light source 800 in an axial direction of the drum 100. The diffuser 900 may surround the light source 800 in a radial direction of the drum 100.

The light source 800 may comprise light emitting diodes (LEDs). The light source 800 may comprise an LED module 810. The LED module may be a mono colour LED module or a multi-colour LED module, for example a Red Green Blue (RGB) LED module. Preferably the LED module is a Red Green Blue White (RGBW) LED module. The LED module may be a high power LED module. The LED module is preferably configured to emit light with a luminous flux of over 100 lm, and more preferably over 200 lm. The light source 800 may comprise a plurality of LED modules 810. The light source is preferably configured to emit light with a luminous flux of over 1000 lm, and more preferably over 1200 lm, and yet more preferably over 1400 lm. The LED modules 810 may be disposed at intervals along the axial direction of the drum 100, as shown in FIG. 4.

The light source 800 is preferably configured not to rotate as the drum 100 rotates.

Light Control Module A light control module configured to control the light source 800 may be provided.

The light control module is preferably configured to control the light source 800 to change a property of the light emitted from the light source. For example, the light control module may be configured to control the light source 800 to change the brightness of light emitted from the light source.

The light control module may be configured to control the light source 800 to emit a selected colour of light. The selected colour of light may be set manually by a user. The selected colour of light may be set automatically. Preferably, the selected colour of light may be set automatically to maximise the contrast between the printed marking and the light emitted from the drum. The selected colour of light may be automatically set based on the assessment image. In this way the ink is clearly visible in the assessment images against the background of the surface of the drum. The colour of the selected light is therefore automatically selected to be a colour in contrast to the colour of the ink used to generate the printed marking.

Diffuser

The test apparatus may comprise a diffuser 900, as shown in FIG. 4. The diffuser 900 is configured to diffuse the light emitted from the light source 800 to illuminate the drum 100. The drum may comprise the diffuser. Desirably, the cylindrical part of the drum may comprise the diffuser. The presence of the diffuser 900 promotes more uniform illumination of the drum 100.

The diffuser 900 is preferably disposed between the light source 800 and the drum 100. This position of the diffuser 900 mitigates glare on the imaging devices due to light from the light source. The diffuser is more preferably disposed between the light source 800 and the printed marking on the surface of the drum 100 when the test apparatus is in use. The diffuser may be disposed in contact with an inner surface of the drum.

The diffuser 900 may be a cylindrical diffuser. The diffuser 900 may be disposed coaxially with the drum 100. In particular, the diffuser 900 may be disposed inside the drum 100.

The diffuser may be integrally formed as part of the drum. In particular, the diffuser may be integrally formed as part of the cylindrical part of the drum. For example, a diffusing surface may be formed on the inner surface of the cylindrical part of the drum. As another example, the cylindrical part of the drum may comprise a material configured to diffuse light.

The diffuser 900 may comprise a polymer comprising acetal. Preferably the diffuser 900 may comprise acetal, and more preferably the diffuser may comprise polyoxymethylene. The diffuser comprising acetal is beneficial because of the relative ease of manufacture, particularly for a cylindrical diffuser. Alternatively, the diffuser may comprise acrylic or polycarbonate, which can also be configured to provide effective diffusion.

First Imaging Device

The printed marking on the surface of the drum may be assessed by manual visual inspection. Preferably, a first imaging device 400 is provided to the test apparatus. The first imaging device 400 is configured to capture assessment images 450 of the surface of the drum. The first imaging device 400 is disposed such that the assessment images 450 include an area of the drum 100 including the printed marking 210 on the surface of the drum. An exemplary assessment image 450 is shown in FIG. 5.

During use, ink is deposited on the surface of the drum 100. The test apparatus is configured such that ink drops 200 are deposited at a first radial position around the central axis of the drum 100. The first imaging device 400 is ideally disposed at a second radial position around the central axis of the drum 100, to capture assessment images 450 of the surface of the drum 100. The ink removal unit 300 is disposed at a third radial position around the central axis of the drum 100. The second radial position is between the first radial position and the third radial position in a direction of rotation of the drum 100.

Thus, the process starts as ink is deposited on the surface of the drum 100 to form a printed marking 210. The drum 100 rotates such that the printed marking 210 is in an area in the field of view of the first imaging device 400. Thus, assessment images 450 of the printed marking 210 on the surface of the drum 100 are captured by the first imaging device 400. The drum 100 continues to rotate and the area of the drum 100 on which the printed marking 210 is formed passes the ink removal unit 300 which removes the ink forming the printed marking 210. Therefore an area of the surface of the drum 100 is cleaned. The drum 100 continues to rotate and the clean area of the drum 100 again passes a radial position corresponding to the first radial position at which the ink ejection device 700 deposits ink on the surface of the drum 100.

The first imaging device 400 may be controlled to capture assessment images 450 at a set time interval. The set time interval may be based on a speed of rotation of the drum 100.

In this way the assessment images 450 can be analysed to determine whether the printed marking 210 is in accordance with the target marking or whether there is one or more artefacts in the printed marking. The analysis of the assessment images 450 may be performed live, during operation of the test apparatus. Alternatively, the assessment images 450 may be stored for analysis after the planned printing, of the entire target marking, is complete.

Print Assessment Unit

The printed marking may deviate from the intended target marking, by an amount exceeding acceptable thresholds, for several reasons. Any artefact in the printed marking may be indicative of a malfunction of the print head, a blockage of the nozzle or an incorrect viscosity of the ink. It is therefore useful to be able to detect artefacts in the printed marking and also determine which nozzle corresponds to the unexpected print result.

The test apparatus may therefore comprise a print assessment unit. The print assessment unit is configured to determine whether there is one or more artefacts in the printed marking 210. An artefact is an unexpected printing result which may indicate a print error caused by the ink, nozzle or print head not functioning as expected. Thus, the print assessment unit is configured to determine that an artefact is present if the printed marking 210 does not correspond, within accepted threshold limits, to the target marking which the ink ejection device 700 is controlled to produce.

The print assessment unit determines the presence of an artefact based on the one or more assessment images 450 captured by the first imaging device 400. The print assessment unit is preferably configured to determine an axial position of any artefacts in the assessment image 450. The axial position in the assessment image 450 corresponds to an axial position of ink drop deposition on the surface of the drum 100. The axial position of an artefact in the assessment image can therefore be used to determine the axial position of the ink drops 200 and corresponding nozzle having an unexpected printing behaviour resulting in the detected artefact. For example, the axial position of artefact 215 in the printed marking 210 captured by the assessment image 450 shown in FIG. 5 may be determined by the print assessment unit.

The print assessment unit may determine an artefact captured in an assessment image based on a line detection algorithm. The print assessment unit may determine an artefact captured in an assessment image based on pixel values in the assessment image 450. The print assessment unit may determine an artefact captured in an assessment image 450 based on a sum of pixel values in a vertical direction of the assessment image 450, as shown in FIG. 5. The print assessment unit may be configured to determine whether there is an artefact in the assessment images based on a comparison of the pixel values in the present assessment image to a moving average of pixel values from previous assessment images.

The use of the light source 800 and drum 100 at least partially transmissive of light means that a good visibility of the ink and contrast between the ink of the printed marking 210 and the surface of the drum 100 can be provided. Thus, the print assessment unit can more accurately determine an artefact in the assessment images 450.

In this way it can be determined when there is an artefact in the printed marking 210, which may correspond to, for example, a malfunction of the nozzle. The existence and axial position of the artefact can be used to determine the corresponding axial position of the ink nozzle and ink droplets causing the artefact. Thus, the cause of the unexpected printing behaviour can be easily identified and addressed.

Second Imaging Device

The first imaging device 400 may be configured to capture droplet evaluation images of ink drops 200. The first imaging device 400 may be configured to capture the droplet evaluation images of ink drops 200 in motion and traveling towards the surface of the drum 100. The first imaging device 400 may therefore be configured to be movable to change the area included in the images captured by the first imaging device 400.

Preferably, as shown in FIGS. 1 and 2, the test apparatus may comprise a second imaging device 500 configured to capture droplet evaluation images of ink drops 200. The second imaging device 500 is configured to capture the droplet evaluation images of ink drops 200 in motion and traveling towards the surface of the drum 100. The ink drops 200 may have been deposited from an ink ejection device 700.

The second imaging device 500 may have a smaller field of view than the first imaging device 400. The second imaging device 500 may be configured to capture microscopic images.

A strobe light unit 600 may be configured to illuminate a field of view of the second imaging device 500. The strobe light unit 600 may be disposed facing the second imaging device 500, preferably such that the ink drops 200 pass between the strobe light unit 600 and the second imaging device 500. The strobe light unit 600 may be configured to emit light at time intervals in synchronisation with the time intervals during which the second imaging device 500 captures the droplet evaluation images. In this way, the strobe light unit 600 provides sufficient illumination for the droplet assessment images of the moving ink drops 200 to be captured by the second imaging device 500.

The test apparatus may further comprise a strobe light setting unit configured to control the strobe light unit 600. The strobe light setting unit may be configured to control the strobe light unit 600 to change a property of the light emitted from the strobe light unit 600. The strobe light unit may be configured to control the brightness of light emitted by the strobe light unit 600. The strobe light unit may be configured to control the colour of light emitted by the strobe light unit 600. The strobe light setting unit may be configured to set the colour of light emitted by the strobe light unit 600 to be the same as the selected colour of light emitted by the light source 800.

The strobe light setting unit may be configured to control the strobe frequency of the strobe light unit 600. The strobe light setting unit may be configured to control the strobe frequency of the strobe light unit 600 based on the rate of ink drop deposition. In this way, the strobe light unit 600 may be configured to adjust the strobe frequency of the strobe light unit 600 such that ink droplets captured in sequential droplet evaluation images appear to be in the same location, giving the appearance of a stationary drop, or falling faster or slower as the droplet evaluation images are viewed in sequence.

Drop Assessment Unit

The test apparatus may comprise a drop assessment unit. The drop assessment unit is configured to analyse the droplet evaluation images 550. FIG. 6 shows an exemplary droplet evaluation image 550. The drop assessment unit may determine the volume of ink drops 200 based on the droplet evaluation images 550.

The drop assessment unit may determine the drop volume of ink drops 200 captured in the drop evaluation images based on a volume estimation algorithm. The volume estimation algorithm may provide an estimation of the volume of the droplets based on the assumption that the droplets have rotational symmetry. Therefore, the drop assessment unit may estimate the volume of the ink drops based on the two-dimensional (2D) area of the ink drops captured in the ink droplet evaluation images. For example, as shown in FIG. 6, the drop assessment unit may determine the 2D area of the ink drops 200 by determining the X-direction breadth of the drops at multiple locations along the Z-direction length of each of the ink drops 200 in the one or more ink droplet evaluation images 550. Alternatively, the drop assessment unit may determine the 2D area of the ink drops 200 by determining the Z-direction length of the ink drops 200 at multiple locations along the X-direction breadth of the drops 200 in the one or more ink droplet evaluation images 550. The center of mass of the ink drops may be estimated based on 2D X-Z position data of the drops. Thus, the drop assessment unit may be configured to determine if there is a change in the position of the center of mass of the drops 200 in the axial Z direction of the drum 100.

Alternatively, the second imaging device may be configured to capture three-dimensional (3D) images. The drop assessment unit may be configured to assess the ink drops based on 3D droplet evaluation images.

Imaging Device Movement Unit

The test apparatus may comprise an imaging device movement unit. The imaging device movement unit is configured to move the second imaging device. In particular, the imaging device movement unit (not shown in the figures) may be configured to move the second imaging device 500 in an axial direction of the drum 100, as shown in FIG. 2.

The imaging device movement unit may be configured to move the second imaging device 500 to a target position selected by a user. In this way, the position of the second imaging device may be changed such that the second imaging device 500 captures droplet evaluation images 550 including an area of interest to the user.

The second imaging device 500 may be automatically moved to a sequence of target positions according to a predetermined pattern. In this way, the position of the second imaging device 500 may be changed such that the second imaging device 500 captures droplet evaluation images 550 of ink drops 200 ejected from different nozzles according to a predetermined pattern, which may be set to individually evaluate droplets ejected from each nozzle in the nozzle head.

The target position of the second imaging device 500 may be based on the axial position of any artefacts in the assessment images 450. Preferably, the imaging device movement unit is configured to move the second imaging device 500 in an axial direction to a target axial position based on the axial position of the artefact in the assessment image 450. The axial position of the artefact in the assessment image 450 may be determined by the print assessment unit. The target axial position may be on the same X-Y plane as the axial position of the artefact in the printed marking 210 on the surface of the drum 100. In this way, the position of the second imaging device 500 may be changed such that the second imaging device 500 captures droplet evaluation images 550 of droplets corresponding to a nozzle in axial alignment with an artefact in the assessment image 450. Therefore, the second imaging device 500 automatically captures droplet evaluation images of droplets in an area of interest, corresponding to an axial position of an artefact. Thus, the second imaging device 500 automatically moves to an area of interest as determined by the analysis of the assessment images 450. Consequently, the cause of the artefact in the assessment image may be established through analysis of the droplet evaluation image 550.

Ink Head Supporting Unit

The ink head supporting unit is configured to support an ink ejection device 700, such as an ink head. The ink head supporting unit is preferably configured such that the ink ejection device 700 can be removed and replaced. The ink head supporting unit may be configured to be adaptable to support different ink ejection devices of different shapes and sizes.

The ink head supporting unit may be configured to be disposed above the drum 100. The ink head supporting unit may be configured to be moveable. The ink head supporting unit may be configured to be moveable to access the drum 100 and/or to remove and replace the ink ejection device 700.

The ink head supporting unit may be configured to be movable in a radial direction of the drum 100. The ink head supporting unit may be configured to be moveable to be closer to or further from the surface of the drum 100. Therefore, the ink head supporting unit is adaptable to different ink ejection devices which may be intended to be disposed closer to or further from the printing surface. Furthermore, certain artefacts, such as a deviation in the ink drop location due to deviation of the angle at which the ink drop is projected from the nozzle, are more easily recognised if the distance between the ink ejection device and the printing surface is increased. Therefore, providing a moveable ink head supporting unit can improve the ability to perform effective evaluations.

Ink Removal Unit

The ink removal unit is configured to remove ink from the surface of the drum. The ink removal unit may comprise a wiper blade or roller, as described in the following preferred examples, however other types of ink removal unit may alternatively be provided. The ink removal unit 300 may comprise a wiper blade 310, 311. The wiper blade 310, 311 is preferably configured to contact the surface of the drum 100 along the axial direction of the drum 100. The wiper blade 310, 311 is more preferably configured to contact the surface of the cylindrical part of the drum 100 along the axial direction of the cylindrical part of the drum 100.

The wiper blade 310 may contact the surface of the drum 100 in a straight line, which may be parallel to the central axis of the drum, as shown in FIGS. 7A and 8A. For example, the edge 30 of the wiper blade 310 may contact the surface of the drum in a straight line, which may be parallel to the central axis of the drum.

The wiper blade 311 is preferably configured to contact the axial center of the surface of the drum 100 at a position further in the direction of rotation of the drum 100 than the position at which the wiper blade 311 contacts the axial ends of the surface of the drum 100. For example, the wiper blade 310 may be wider at the axial center of the drum 100 than at the axial ends of the drum 100, as shown in FIGS. 7B and 8B. For example, the axial central position 32 of the wiper blade 311 may contact the surface of the drum 100 at a position further around the circumference of the drum 100 in the direction of rotation of the drum than the position on the surface of the drum 100 where the axial end 31 of the wiper blade 311 contacts the surface of the drum 100, as shown in FIG. 8B.

The wiper blade 310, 311 may comprise a resilient part to contact the surface of the drum. The resilient part may comprise rubber.

The ink removal unit may comprise a wiper blade 310, 311 and a wiper blade holder 320, 321 configured to hold the wiper blade 310, 311. The wiper blade holder 320 may grip the wiper blade 310 in a straight line, which may be parallel to the central axis of the drum 100, as shown in FIG. 7. The wiper blade holder 321 may grip the wiper blade 310, 311 at a higher location on the wiper blade 310, 311 at the edges of the wiper blade 310, 311 than in the middle of the wiper blade 310, 311, in an axial direction of the drum, as shown in FIG. 9. With this tilted grip configuration of the wiper blade holder 321, ink removed from the surface of the drum 100 and transferred to the wiper blade 310, 311 is guided towards the center of the wiper blade holder 321. In this way, the ink is not directed to the axial ends of the wiper blade 310, 311, which is undesirable because the ink at the edges might become deposited on the axial ends of the drum 100. Ink at the axial ends of the drum 100 may enter the drum if the seal around the terminal ends of the drum 100 is compromised.

Alternatively, the ink removal unit 300 may comprise a roller. The ink removal unit 300 may comprise a transfer roller to transfer the ink from the surface of the drum 100 to another surface, for example a recording medium.

Ink Recycling Unit

The test apparatus may comprise an ink recycling unit. The ink recycling unit is configured to collect ink removed from the surface of the drum by the ink removal unit. The ink recycling unit may be configured to supply the collected ink back to the ink ejection device. The ink recycling unit may comprise a feed pump to convey collected ink back to a supply tank. The supply tank may be a tank to supply ink to the ink ejection device. The ink recycling unit may comprise a filter unit configured to filter the collected ink. Thus, the recycled ink may be filtered prior to reuse by the ink ejection device. The ink recycling unit provides the advantage that the test apparatus does not require exhaustive consumables. Therefore, the test apparatus may be use for extended, essentially indefinite, durations of testing. Furthermore, the ink recycling unit also aids in maintaining a constant level of ink in the supply tank. Thus pressure variations, which could otherwise occur as a consequence of falling ink levels, are mitigated.

Printing Device

A printing device may comprise the test apparatus of the present disclosure. The drum of the test device provides a re-usable surface for printing the printed marking. Therefore, there is no requirement to replace the recording medium in order to continue to perform the test process once the recording medium has been used. The test process can therefore be performed continuously, while the printing device is in use. This provides the benefit that small printing errors can be detected. Irregular printing performance may be identified before the printed images are noticeably affected. As such, it is possible to stop the print and/or provide a signal to the user informing them of the issue before the printed images are noticeably affected. Therefore the cost and time wasted on poor printing poor quality images may be avoided.

The ink removal unit may be configured to transfer ink from the surface of the drum to a recording medium. For example, the ink removal unit may comprise a transfer roller. In this way, the printed markings on the surface of the drum may be used to form a printed image on the recording medium.

Test Method

A method of testing may comprise the steps of: depositing ink drops on a drum to form a printed marking on the surface of the drum, the drum is at least partially transmissive of light; controlling a light source disposed inside the drum to illuminate the drum; and removing the ink from the surface of the drum.

There may be a step of controlling the light source to emit a selected colour of light. This step may include automatically varying the selected colour of light emitted by the light source to maximise the contrast between the printed marking and the light emitted from the drum. There may be a step of controlling the light source to emit a selected brightness of light.

A step of observing the printed markings on the surface of the drum may be performed manually by visual observation, such as performed by eye by a user. The printed markings on the surface of the drum may preferably be reviewed by a step of capturing assessment images of an area of the surface of the drum including the printed marking on the surface of the drum.

The method may further comprise a step of determining if there is an artefact in the printed marking based on the assessment images. The method may comprise capturing the assessment images using a first imaging device. The method may comprise a further step of determining the axial position of the artefact in the assessment image, if an artefact is detected.

The method may further comprise a step of capturing ink droplet evaluation images of the ink drops in motion towards the surface of the drum. The method may comprise capturing the ink droplet evaluation images using a second imaging device.

If an artefact is detected, the method optionally comprises a step of moving the second imaging device to a target axial position based on the determined axial position of the artefact in the assessment image.

Details of a preferred exemplary test process are provided in FIG. 10. Step S1, as shown in FIG. 10, is the start of ink deposition on the drum to form a printed marking on the surface of the drum. In step S2, the light source is controlled, for example by the light source control unit. The light source may be controlled to emit a selected colour of light and/or to emit a selected brightness of light. The light source may be controlled manually or automatically, as described above. In step S3, the assessment images of the printed marking on the surface of the drum may be captured by the first imaging device. In step S4, the assessment images are analysed by the print assessment unit, which may be comprised within an analysis apparatus. In particular, in step S4, the printed marking captured in the assessment images may be compared to the target marking that was intended to be produced. In step S5 it is determined, for example by the analysis apparatus, whether there is an artefact in the assessment images.

If no artefact is detected in the assessment images then the process proceeds to step S6. In step S6 it is determined, for example by the analysis apparatus, whether the test run has completed. The completion of the test run may be determined by the expiry of the scheduled duration of the test. Alternatively, the end of the test run may be determined if the full target marking intended to be printed has been printed from an ink ejection device. If the test run is completed, then step S7 is performed to store the current printing parameters as viable parameters, for example by the analysis apparatus. The printing parameters may include, for example, ink pressure in an ink ejection device supply line, the temperature of ink and/or the drive waveform for an ink ejection mechanism. The process then proceeds to step S8 which is the end of the test.

If an artefact is detected in the assessment images then the process proceeds from step S5 to step S9. In step S9 the second imaging device is moved to an axial position of the drum corresponding to the axial position at which an artefact has been detected. In step S10, ink droplet evaluation images, of the ink drops in motion towards the drum, are captured by the second imaging device. In step S11, the ink droplet evaluation images and/or the assessment images are analysed, for example by the analysis apparatus, to identify the type of the detected artefact. In step S12, the artefact data, which may include the artefact type classification and corresponding printing parameters, is stored, for example by the analysis apparatus. In step S13 it is determined whether or not the analysis apparatus predicts that recovery, to a state in which the detected artefact will not recur, is possible by adjustment of priming parameters. If it is determined that recovery is not possible, the test process ends, at step S8. If it is determined that recovery is possible then the process proceeds to step S14. In step S14, the printing parameters are adjusted in an attempt to mitigate recurrence of the artefact in subsequently captured assessment images. The printing parameters may be adjusted manually by a user or automatically, for example by the analysis apparatus, in step S14. The process then returns to step S3, with the capture of further assessment images, corresponding to the updated printing parameters.

Steps S11 to S14 are additional steps to provide a process for the live update of printing parameters during the test run. In this way, the viable printing parameters, which are not associated with the occurrence of artefacts, can be more readily determined and print performance can be improved. The assessment images and ink droplet evaluation images may be stored for analysis after the test run is complete, either in addition to or instead of performing the live updates during the test run.

Conclusion

The test apparatus according to the present disclosure may be used in various applications, for example, the evaluation of ink, ink heads and ink nozzles.

Aspects of the present disclosure have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention, as defined by the claims.

The present application is based on and claims priority of United Kingdom Priority Application No. GB 2002208.3 filed on Feb. 18, 2020, the entire contents of which are hereby incorporated herein by reference.

The invention claimed is:

1. A test apparatus comprising a drum configured such that ink drops deposited on a surface of the drum form a printed marking on the surface of the drum, the drum being at least partially transmissive of light;
   an ink removal unit configured to remove ink from the surface of the drum;
   a light source disposed inside the drum to illuminate the drum; and
   a diffuser disposed between the light source and the drum, wherein the diffuser is a cylinder disposed coaxially with the drum.

2. A test apparatus according to claim 1, further comprising
   a first imaging device configured to capture assessment images of the surface of the drum, wherein the assessment images include an area of the drum including the printed marking on the surface of the drum.

3. A test apparatus according to claim 1, further comprising
   a light control module configured to control the light source to emit a selected colour of light.

4. A test apparatus according to claim 3, wherein
   the light control module is configured to automatically vary the selected colour of light emitted by the light source to maximise a contrast between the printed marking and a light emitted from the drum.

5. A test apparatus according to claim 1, wherein
   the drum comprises a glass cylinder.

6. A test apparatus according to claim 1, wherein
   the diffuser comprises a polymer comprising acetal.

7. A test apparatus according to claim 1, further comprising
   a second imaging device configured to capture droplet evaluation images of ink drops, wherein the ink drops are in motion and traveling towards the surface of the drum.

8. A test apparatus according to claim 7, further comprising
   a strobe light unit disposed facing the second imaging device and configured to illuminate a field of view of the second imaging device at time intervals in synchronisation with the time intervals during which the second imaging device captures the droplet evaluation images.

9. A test apparatus according to claim 1, further comprising
   an ink head supporting unit configured to support an ink ejection device and to be movable in a radial direction of the drum.

10. A test apparatus according to claim 1, wherein
    the test apparatus is an ink drop observation apparatus.

11. A test apparatus according to claim 1, wherein
    the ink removal unit comprises a wiper blade configured to contact the surface of the drum along an axial direction of the drum, wherein the wiper blade is configured to contact an axial centre of the surface of the drum at a position further in a direction of rotation of the drum than a position at which the wiper blade contacts axial ends of the surface of the drum.

12. A printing device comprising
    a test apparatus according to claim 1,
    wherein the ink removal unit is configured to transfer ink from the surface of the drum to a recording medium.

13. A test apparatus comprising
    a drum configured such that ink drops deposited on a surface of the drum form a printed marking on the surface of the drum, the drum being at least partially transmissive of light;
    an ink removal unit configured to remove ink from the surface of the drum;
    a light source disposed inside the drum to illuminate the drum;
    a first imaging device configured to capture assessment images of the surface of the drum, wherein the assessment images include an area of the drum including the printed marking on the surface of the drum;
a second imaging device configured to capture droplet evaluation images of ink drops, wherein the ink drops are in motion and traveling towards the surface of the drum;
a print assessment unit configured to
  determine an artefact in the printed marking based on the assessment images captured by the first imaging device, and
  determine an axial position of the artefact in the assessment image; and
an imaging device movement unit configured to move the second imaging device in an axial direction of the drum based on the axial position of the artefact in the assessment image.

14. A test apparatus according to claim 13, further comprising
a light control module configured to control the light source to emit a selected colour of light.

15. A test apparatus according to claim 14, wherein
the light control module is configured to automatically vary the selected colour of light emitted by the light source to maximise a contrast between the printed marking and a light emitted from the drum.

16. A test apparatus according to claim 13, wherein
the ink removal unit comprises a wiper blade configured to contact the surface of the drum along the axial direction of the drum, wherein the wiper blade is configured to contact an axial centre of the surface of the drum at a position further in a direction of rotation of the drum than the position at which the wiper blade contacts axial ends of the surface of the drum.

17. A test apparatus comprising
a drum configured such that ink drops deposited on a surface of the drum form a printed marking on the surface of the drum, the drum being at least partially transmissive of light;
an ink removal unit configured to remove ink from the surface of the drum;
a light source disposed inside the drum to controllably illuminate the drum;
a light control module configured to control the light source to emit a selected colour of light;
a second imaging device configured to capture droplet evaluation images of ink drops, wherein the ink drops are in motion and traveling towards the surface of the drum;
a strobe light unit disposed facing the second imaging device and configured to illuminate a field of view of the second imaging device at time intervals in synchronisation with the time intervals during which the second imaging device captures the droplet evaluation images; and
a strobe light setting unit configured to set a colour of light emitted by the strobe light unit to be the same as the selected colour of light emitted by the light source.

18. A test apparatus according to claim 17, wherein
the light control module is configured to automatically vary the selected colour of light emitted by the light source to maximise a contrast between the printed marking and a light emitted from the drum.

19. A test apparatus according to claim 17, wherein
the ink removal unit comprises a wiper blade configured to contact the surface of the drum along an axial direction of the drum, wherein the wiper blade is configured to contact an axial centre of the surface of the drum at a position further in a direction of rotation of the drum than the position at which the wiper blade contacts axial ends of the surface of the drum.

20. A test method comprising
depositing ink drops on a drum to form a printed marking on a surface of the drum, the drum being at least partially transmissive of light;
controlling a light source disposed inside the drum to illuminate the drum;
capturing, by a first imaging device, assessment images of the surface of the drum, wherein the assessment images include an area of the drum including the printed marking on the surface of the drum;
capturing, by a second imaging device, droplet evaluation images of ink drops, wherein the ink drops are in motion and traveling towards the surface of the drum;
removing ink from the surface of the drum;
determining an artefact in the printed marking based on the assessment images captured by the first imaging device,
determining an axial position of the artefact in the assessment image; and
moving the second imaging device in an axial direction of the drum based on the axial position of the artefact in the assessment image.

* * * * *